Figure 1:
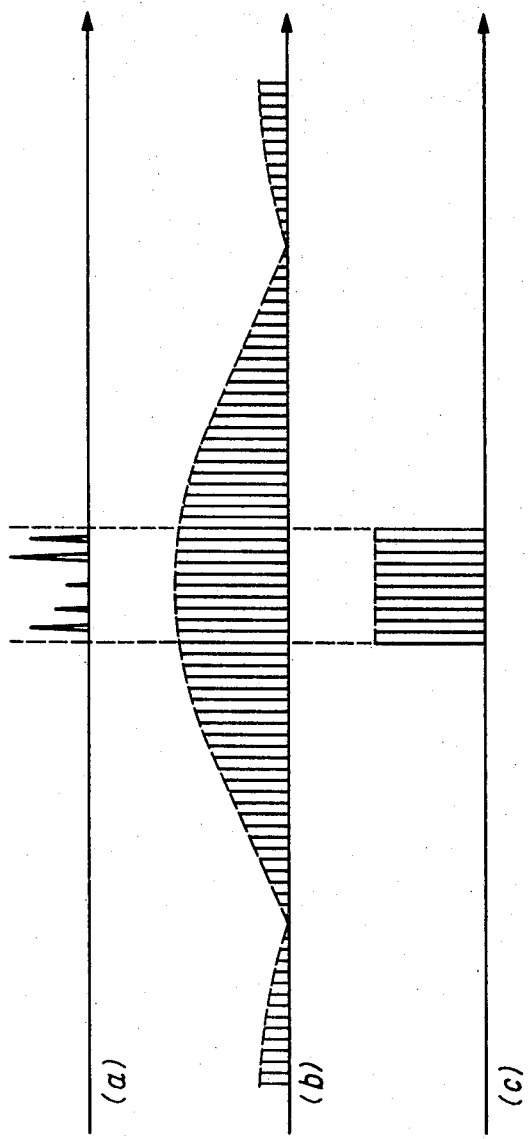

United States Patent [19]

Tschopp

[11] 3,812,418

[45] May 21, 1974

[54] DEVICE FOR THE EXCITATION OF SPIN RESONANCES BY MEANS OF AN RF SIGNAL HAVING A PRESCRIBED AMPLITUDE FUNCTION

[75] Inventor: Werner Heinz Tschopp, Fallanden, Switzerland

[73] Assignee: Spectrospin AG, Zurich, Switzerland

[22] Filed: July 13, 1971

[21] Appl. No.: 162,141

[30] Foreign Application Priority Data
Nov. 27, 1970 Germany.......................... 2058447

[52] U.S. Cl............................................ 324/0.5 R
[51] Int. Cl. .......................................... G01n 27/78
[58] Field of Search .................... 324/0.5 A, 0.5 AC

[56] References Cited
UNITED STATES PATENTS
3,588,678 6/1971 Ernst................................ 324/0.5 A
3,622,765 11/1971 Anderson......................... 324/0.5 A

*Primary Examiner*—Michael J. Lynch
*Attorney, Agent, or Firm*—Craig and Antonelli

[57] ABSTRACT

In the excitation of spin resonances by means of an RF-pulse in a sample arranged in a homogeneous magnetic field for purposes of spin resonance spectrometry, a limitation of the energy of excitation to the frequency range of interest and an essentially constant amplitude of the energy of excitation in that range of frequency is achieved by application of an RF-pulse with an amplitude variable in time which, at least approximately, corresponds to a sine $x/x$ function. Such amplitude function can be generated by a modulation unit which is controlled either by a digital computer with a stored amplitude function or by the output signal of an analog computer solving a suitable differential equation.

4 Claims, 3 Drawing Figures

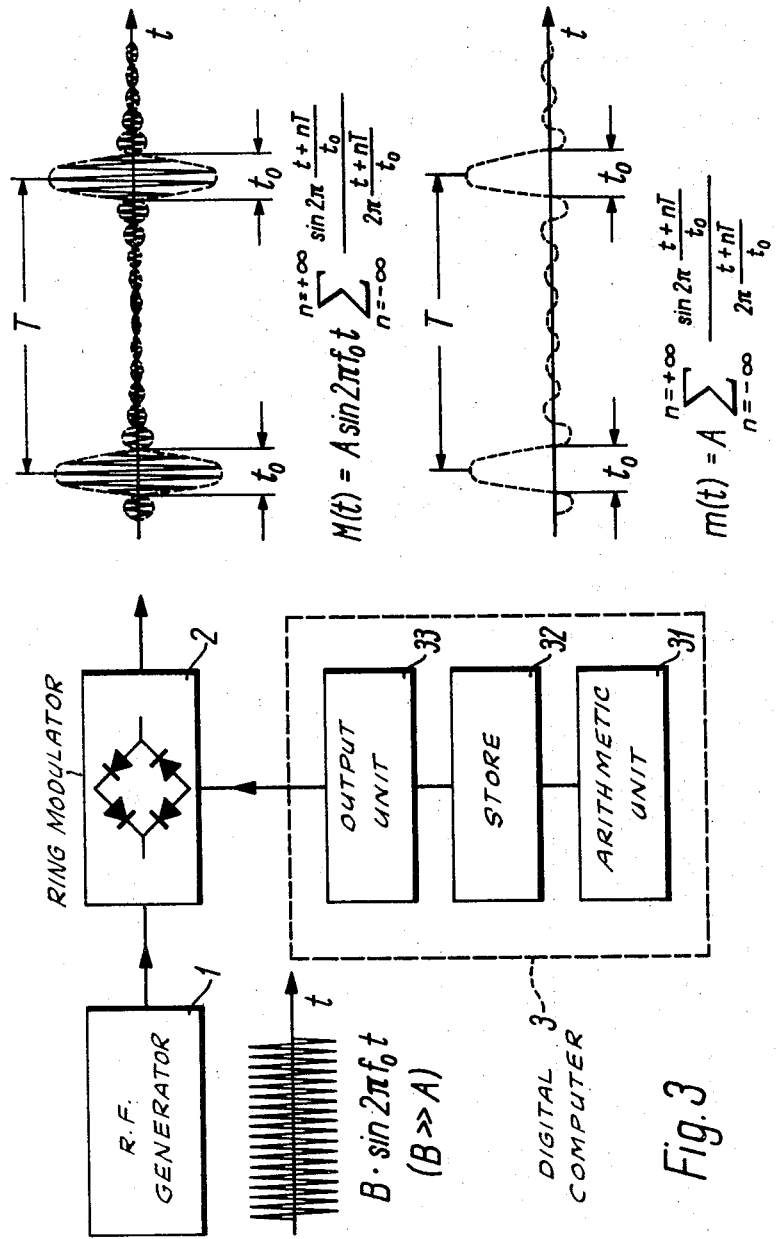

DEVICE FOR THE EXCITATION OF SPIN RESONANCES BY MEANS OF AN RF SIGNAL HAVING A PRESCRIBED AMPLITUDE FUNCTION

The present invention relates to a method of excitation of spin resonances for spin resonance spectrometry in which the spin moments orientated in a magnetic field are supplied such an amount of RF-energy of frequencies at least approximately equal to the Larmor frequencies of the spin moments to be excited in the existing magnetic field by means of an RF-signal of an amplitude variable with time corresponding to the frequency spectrum of that signal, that the spin moments are distorted by an angle $\alpha$, specifically 90°, relative to the direction of the magnetic field.

So far, only rectangular pulses have been used as RF-signals of an amplitude variable with time for the excitation of spin resonances. The application of rectangular pulses does ensure the generation of a sufficiently broad frequency spectrum to excite the desired spin moments, but the application of such rectangular pulses has the disadvantage that the amplitude of the frequency spectrum is a sine $x/x$ function, i.e., the energy of the excitation pulse is distributed over the individual lines of the frequency spectrum in a very irregular way. Therefore, if a large width of the spectrum were utilized, the spin moments having different Larmor frequencies would be supplied also different amounts of energy. Since, moreover, a specific amount of energy is required to distort a spin moment relative to the direction of the magnetic field by an angle $\alpha$, part of the spin moments would be distorted less than $\alpha$, other parts more than $\alpha$, relative to the direction of the magnetic field as a consequence of the different energies of excitation, which would no longer allow a correct evaluation of the measurements. As a consequence, only a small part in the range of the main peak of the frequency spectrum can be used for excitation of the spin moments in such a way that the variation of the amplitude of the frequency lines does not exceed a specific amount of, for instance, 5 percent. As a consequence, the width of the rectangular pulses must be chosen small enough to result in a frequency spectrum in which the Larmor frequencies of the spin moments to be excited are in the range of the main peak in which the amplitude of the frequency lines changes by less than 5 percent. The energy fraction of the frequency spectrum outside this range thus is lost as excitation energy; so, an unnecessarily large expenditure of RF-energy is needed to excite the desired spin moments. In addition, disturbing influences, e.g., additional parasitic lines in the Fourier-transformed interferogram, can be produced as a consequence of the excitation of spin moments by the RF-energy outside the desired range of frequency which should not be excited at all and thus cause spurious signals.

The present invention is based on the problem of avoiding these disadvantages of the present type of excitation of spin resonances.

In the invention, this problem is solved by selecting for the amplitude of the RF-signal which is variable with time a curve which deviates from a rectangular pulse in such a way that the frequency spectrum of this signal is limited essentially to the range of the Larmor frequencies of the spin moments to be excited and has an essentially constant amplitude within this range.

A spectrum with a constant amplitude limited to a specific frequency range can be achieved if a sin $x/x$ function is chosen as the curve for the amplitude variable with time of the RF-signal. This fact stems from the duality of time and frequency functions of the Fourier transform. Just as a rectangular pulse as a time function results in a frequency spectrum whose amplitude changes by a sin $x/x$ function, an RF-signal with an amplitude changing in time by a sin $x/x$ function results in a frequency spectrum which has a rectangular shape, i.e., is limited to a specific range and has a constant amplitude within that range. However, it is self-evident that also other signals with a change of amplitude other than a sin $x/x$ function can be used, in particular sections of such a function with a limitation in time which result in a sufficiently approximate rectangular frequency spectrum.

The application of an RF-signal according to the invention and thus of a limited frequency spectrum of an amplitude at least approximately constant not only has the advantage of all the RF-energy employed being used for excitation of the spin moments present in the range of interest, i.e., that only a minimum of RF-energy is sufficient and that no spurious resonances are excited, but it also offers the possibility of applying also such RF-signals if investigations are to be carried out with broadband decoupling. Also in that case there have been difficulties with respect to the high RF-power required and, on the other hand, due to the disturbance of adjacent frequency ranges by this high RF-power. These difficulties are removed immediately if a sharply peaked frequency spectrum according to the invention is used. In that case, all of the RF-power available is used for the frequency range to be decoupled, for no RF-energy is lost to adjacent frequency ranges and no adjacent frequency ranges are disturbed by the RF. The application of a sharply peaked frequency spectrum even offers the possibility of selective decoupling of individual groups of lines within a spectrum, which may be termed "limited broadband decoupling." Also the familiar off-resonance decoupling could be regarded as a specific case of limited broadband decoupling.

Especially in Fourier spectroscopy in which the spin moments, which are distorted by an angle $\alpha$, relative to the direction of the magnetic field in the selected frequency range, perform relaxation oscillations after the end of the excitation pulse, all of which are simultaneously recorded as an interferogram, the excitation is usually repeated periodically and the interferograms are stored in order to furnish an improved signal-to-noise ratio after averaging. Also if the RF-signals according to the invention are used, such periodically repeated excitation is possible if signals are used which are limited in time, such as sections of a sin $x/x$ function. In a perferred embodiment of the method according to the invention, however, the periodically repeated excitation is carried out by an RF-signal which at least approximately satisfies the sum $$A \sin 2\pi f_0 t \sum_{n=-\infty}^{n=+\infty} \frac{\sin 2\pi \frac{t+nT}{t_0}}{2\pi \frac{t+nT}{t_0}}$$

where
- $f_o$ is the frequency of the modulated RF-oscillation,
- A is the maximum amplitude of the RF-oscillation (= peak of the main pulse),
- T is the period of the repeated excitation,
- $t_o$ is a time constant resulting from the relation $t_o = 2/\Delta f$ with $\Delta f$ = the desired width of the frequency spectrum, and
- $t$ is the time.

Also such signal has a periodic shape with the period T and, as a consequence, results in the desired periodic excitation of the spin moments. The amplitude shape of this signal can be determined easily, for instance, by means of a digital computer.

The invention also includes devices for implementation of the method according to the invention. Such device comprises a store containing the desired amplitude function of the RF-signal, and a converter connected with the store and generating voltages proportional to the amplitude function, which converter supplies these voltages to a modulator to which, in addition, the RF-signal to be modulated is fed from an RF-generator.

The amplitude function may have been recorded, for instance, as an analog signal on a magnetic tape which is moved past a magnetic head in a loop containing a specific number of periods of the signal, which head generates voltages proportional to the amplitude of the signal recorded which are then fed to the modulator, if necessary, after previous amplification. Especially when the amplitude function is determined by a computer, the device according to the invention can use also the digital store of such computer which, in that case, comprises an output unit connected with the modulator and containing a digital-analog converter which periodically scans the store and accordingly supplies to the modulator voltages corresponding to the content of the store. A preferred type of modulator used is a ring modulator.

Another possibility of generating the sin $x/x$ function is the programming in a computer, preferably an analog computer, of the differential equation whose solution results in the sin $x/x$ function. The respective differential equation is $$d^2y/dt^2 + (2/t)(dy/dt) + (2\pi)/t_o^2 \, y = 0$$

and its solution $$y = [\sin 2\pi(t/t_o)/2 \, (t/t_o)]$$

The width $t_o$ of the main pulse can be fixed by changing the parameter $(2\pi/t_o)$.

The analog computer in this case assumes the functions of an oscillator. The first and third summands of the differential equation represent the harmonic sinusoidal oscillation. The second summand contains the attenuation acting on the sinusoidal oscillation. The output signal representing the solution of the differential equation is then supplied again to a modulator to which also the RF-signal which is to be modulated is fed by an RF-generator.

Further details and modifications of the present invention can be taken from the following description in which the invention is described in more detail and explained on the basis of the embodiment shown on the drawing. The characteristics to be seen from the description and the drawing may be applied in other embodiments of the invention either singly or in multiples in any combination.

Figure 2:
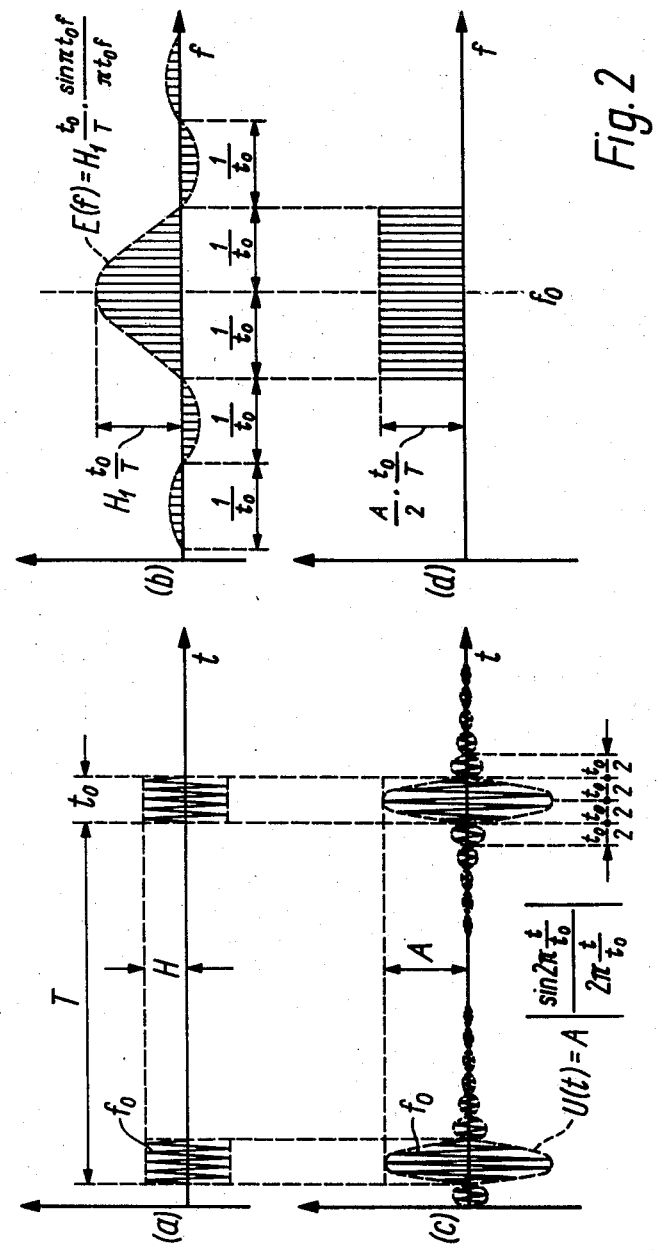

FIG. 1 is a diagram explaining spin moments with frequency spectra of different shapes, FIG. 2 is a diagram explaining the generation of frequency spectra in the way known until now and of the frequency spectra according to the invention, FIG. 3 is the block diagram of a device according to the invention with representations of the signals generated.

In the diagram according to FIG. 1 line (a) shows the resonance frequencies of the spin moments to be excited. So far, rectangular pulses have been used for excitation of these spin moments which have a frequency spectrum as shown in line (b). The envelope of this frequency spectrum is a sin $x/x$ function. The pulse repetition frequency determines the line density within the frequency spectrum, while the pulse width determines the amplitude shape of the spectrum. In order to ensure uniform excitation of the spin moments and, especially, a specific rotation as a result of excitation by, for instance, 90° relative to the direction of a constant magnetic field, only a relatively small fraction of the frequency spectrum (b) can be applied in which the amplitude of this frequency spectrum is approximately constant and varies by not more than, e.g., 5 percent. It is evident that the frequency spectrum (b) contains * (* a great many lines outside this range, i.e. that) a large fraction of the energy of the RF-pulse falls in a range which cannot be utilized for excitation of the spin moments. Moreover, there is the danger of the frequencies of the frequency spectrum which are outside the range of interest exciting spin moments whose investigation is not intended and which therefore disturb the result of the measurement. Therefore, the invention provides for the use of a frequency spectrum for excitation as shown in line (c) of FIG. 1. This frequency spectrum is limited to a range which includes also the resonance frequencies of the spin moments to be investigated and has a constant amplitude in that range. Clearly, if such spectrum were applied, the total energy contained in this spectrum would be used for excitation of the desired spin moments, thus minimizing energy requirements. Moreover, all spin moments are uniformly excited because the frequency spectrum has a constant amplitude in the entire range. It is possible by means of the invention to achieve, at least approximately, a spectrum as sharply limited as that shown in line (c) of FIG. 1.

FIG. 2 in diagram (a) shows RF-pulses as a function of time with the carrier frequency $f_o$, the amplitude H, the pulse repetition frequency T, and the pulse length $t_o$. Fourier transform of such RF-pulses results in a frequency spectrum of the type shown in diagram (b) of FIG. 2. The envelope of this frequency spectrum is a function $$E(f) = H_1 \, (t_o/T) \, (\sin\pi t_o f/\pi t_o f).$$

As explained above on the basis of FIG. 1, only a small fraction of this frequency spectrum can be used for spin moment excitation.

The duality between the time function and the frequency function of the Fourier transform conversely has the result that a rectangular frequency function as shown in diagram (d) of FIG. 2 and corresponding to the time function according to diagram (a) can be generated by a time function according to diagram (c) of FIG. 2, which corresponds to the frequency function of diagram (b). Accordingly, for generation of a rectangular frequency spectrum according to diagram (d) of FIG. 2, a periodic RF-signal with the carrier frequency $f_o$ is used which is modulated in accordance with the function $$U(t) = A \left| \frac{\sin 2\pi t/t_0}{2\pi t/t_0} \right|.$$

Actually, the function U(t) is unlimited in terms of time, but the amplitudes at both sides of the main lobe decrease so rapidly that their contribution to the shape of the frequency spectrum becomes negligibly small and it is sufficient therefore to use a finite section of the function U(t). However, it would be possible also to use an RF-signal for periodic excitation of the spin moments which is modulated with a signal $m(t)$ resulting from a superposition of signals U(t) which are shifted in time by the period of the repeated excitation. If the use of such modulation signal should lead to the secondary pulses not decaying rapidly enough between the main pulses with amplitude A occurring at intervals T, so that it would be impossible to clearly observe the precession movements of the spins from the excitation source in the intervals between the main pulses, it is possible by means of the familiar method of modulation to exclude the effects of the direct influence (called leakage) of the excitation source on the observation channel of the receiver. The modulation frequency used for the process of modulation should be chosen relatively high so that the AF-amplifiers process the maximum desirable frequency range without any disturbance and are able to sufficiently attenuate the undesired range. In a frequency spectrum of 10 kHz bandwidth, for instance, a modulation frequency of about 40 kHz should be employed so that the AF-amplifier is able to process the maximum desired frequency range of 2 × 10 kHz and still provide sufficient attenuation of the undesired range between 0 and 10 kHz. Since sharply limited frequency spectra according to the invention are used, the spin moment signal contaminated with leakage in the range between 0 and 10 kHz should no longer have an influence on the clean spin moment signal in the pass band of the AF-amplifier.

FIG. 3 shows a simple device for generation of an excitation signal according to the invention. This device consists of an RF-generator 1 which generates a carrier signal B sin $2\pi f_o t$ and feeds it to a ring modulator 2. This ring modulator is supplied with the signal mentioned above by a computer 3, which signal is composed of a finite section of the sin $x/x$ signal or a superposition of sin $x/x$ signals shifted relative to each other in time. In particular, the time function $m(t)$ may have been generated by the arithmetic unit 31 of the digital computer 3 and then fed into its store 32. The function $m(t)$ contained in the store 32 is scanned by means of the output unit 33 of the computer, which contains a digital-analog converter, and is converted into a voltage proportional to the function $m(t)$ which is fed to the ring modulator 2 in such a way that the output signal M(t) modulated with the function $m(t)$ is generated.

The speed required for generation of the modulation signal and the storage capacity of the digital computer 3 are within the framework of the usual design data. For instance, a limited frequency spectrum of 10 kHz bandwidth in accordance with FIG. 2 requires a width of the main pulse of $$2 \cdot 1/t_0 = 10^4 \text{ Hz}$$

This results in $t_0 = 200$ μsec. It is assumed that 20 amplitude values are recorded for the shape of this main pulse so that 20 storage locations are required for registration of the main pulse. For scanning of the storage locations this would require a speed of 200 μsec/20 storage locations = 10 μsec/storage location This speed of operation is quite possible for a digital computer.

For reasons of symmetry, only a range T/2 needed to be stored of the function $m(t)$. With a maximum number of 1000 storage locations, it would then be possible to register 99 secondary pulses, which is also fully sufficient.

Of course, the present invention is not limited to the embodiment described herein but allows many other possibilities of recording the modulation signal. In particular, it is possible also to store the periodically repeating modulation signal on magnetic tape or any other carrier as an analog signal and then move this carrier in a closed loop past a scanning head which could convert the recorded signal into a voltage suitable for modulation. Another possibility is the use of an analog computer programmed for the solution of the differential equation $$(d^2y/dt^2) + (2/t)(dy/dt) + (2\pi/t_0)^2 y = 0$$

whose output signal, which represents the solution of this differential equation, is fed to the modulator 2 instead of the output signal of the digital computer 3.

What we claim is:

1. In a method of excitation of spin resonances for spin resonance spectrometry, including the steps of immersing a spin resonance sample in a unidirectional magnetic field, applying a pulse of RF-energy with frequencies near the Larmor frequencies of the sample, receiving a composite signal produced by the spin moments which precess after the application of the RF-energy and analyzing the components of the received signal, in which the spin moments oriented in said magnetic field are fed such an amount of RF-energy with frequencies at least approximately equal to the Larmor frequencies of the exciting spin moments by means of an RF-signal with an amplitude variable in time corresponding to the frequency spectrum of that signal, that the spin moments are distored by a specific angle α, preferably 90°, relative to the direction of the magnetic field, the improvement comprising the step of using an RF-signal for excitation having a shape so deviating from rectangular that the frequency spectrum of that signal is limited essentially to the range of the Larmor frequencies of the spin moments to be excited and has an essentially constant amplitude within that range.

2. A method according to claim 1, characterized in that the shape chosen for the amplitude variable with time of the RF-signal is at least approximately a section of a sin $x/x$ function.

3. A method according to claim 2 with periodically repeated excitation, characterized in that an RF-signal is used for excitation which at least approximately satisfies the sum $$A \sin 2\pi f_0 t \sum_{n=-\infty}^{n=+\infty} \frac{\sin 2\pi \frac{t+nT}{t_0}}{2\pi \frac{t+nT}{t_0}}$$

where $f_o$ is the frequency of the modulated RF-oscillation,

A is the maximum amplitude of the RF-oscillation (= peak of the main pulse),

T is the period of the repeated excitation, $t_o$ is a time constant resulting from the relation $t_o = 2/\Delta f$ with $\Delta f =$ desired width of the frequency spectrum, and $t$ is the time.

4. A method according to claim 1, characterized in that the RF-energy supplied is selected high enough to decouple all spin resonances falling in the peaked frequency spectrum of RF-excitation.

* * * * *